(12) United States Patent
Shi

(10) Patent No.: US 8,982,518 B2
(45) Date of Patent: Mar. 17, 2015

(54) METHODS AND APPARATUS TO PROVIDE TRANSIENT EVENT PROTECTION FOR CIRCUITS

(71) Applicant: The Boeing Company, Chicago, IL (US)

(72) Inventor: Fong Shi, Clyde Hill, WA (US)

(73) Assignee: The Boeing Company, Chicago, IL (US)

( * ) Notice: Subject to any disclaimer, the term of this patent is extended or adjusted under 35 U.S.C. 154(b) by 180 days.

(21) Appl. No.: 13/829,451

(22) Filed: Mar. 14, 2013

(65) Prior Publication Data

US 2014/0268467 A1 Sep. 18, 2014

(51) Int. Cl.
*H02H 9/00* (2006.01)
*G06F 17/50* (2006.01)
*H01L 27/02* (2006.01)
*H02H 9/04* (2006.01)

(52) U.S. Cl.
CPC .......... *H02H 9/005* (2013.01); *G06F 17/5068* (2013.01); *H01L 27/0259* (2013.01); *H02H 9/046* (2013.01); *G06F 17/5081* (2013.01)
USPC .......................................................... 361/56

(58) Field of Classification Search
USPC .......................................................... 361/56
See application file for complete search history.

(56) References Cited

U.S. PATENT DOCUMENTS 5,055,711 A * 10/1991 Dobkin ........................ 327/310
5,293,083 A * 3/1994 Askin et al. ..................... 326/71
5,569,982 A * 10/1996 Nadd .......................... 315/209 T
2001/0043449 A1 11/2001 Okushima
2009/0094568 A1 4/2009 Shukla et al.

OTHER PUBLICATIONS

"New Flow for Automating Verification of ESD Design Rules", SOC-centralm contributor Mentor Graphics Corp., dated Aug. 3, 2009, retrieved on Feb. 4, 2013 from <www.soccentral.com/results.asp?EntryID=29425> (6 pages).
European Patent Office, "Extended European Search Report," issued in connection with European Patent Application No. 14155244.8, issued on Jul. 4, 2014, 8 pages.
Wang et al., "An On-Chip ESD Protection Circuit with Low Trigger Voltage in BiCMOS Technology," IEEE Journal of Solid-State Circuits, IEEE Service Center, Piscataway, NJ, vol. 36, No. 1, Jan. 2001, 6 pages.

* cited by examiner

*Primary Examiner* — Stephen W Jackson
(74) *Attorney, Agent, or Firm* — Hanley, Flight & Zimmerman, LLC

(57) ABSTRACT

Methods and apparatus to provide transient event protection for circuits are disclosed. An example apparatus includes a first clamp circuit. The first power circuit provides a first reference voltage. The first clamp circuit directs energy from a signal node to the first power circuit in response to a transient resulting in a voltage at the signal node being lower than a second reference voltage. The apparatus also includes a second clamp circuit. The second clamp circuit includes a transistor. A collector terminal of the transistor is prevented from having a lower voltage than the second reference voltage. A second power circuit provides the second reference voltage, which is lower than the first reference voltage. The second clamp circuit directs energy from the signal node to the second power circuit in response to a transient resulting in the voltage at the signal node being higher than the first reference voltage.

24 Claims, 8 Drawing Sheets

METHODS AND APPARATUS TO PROVIDE TRANSIENT EVENT PROTECTION FOR CIRCUITS

BACKGROUND

Aerospace environments present challenging conditions to electronic components. For example, electrical and mechanical interconnections between integrated circuits and underlying substrates may fail after exposure to moisture, temperature cycling, and/or vibration. Metal corrosion, solder creep, material fatigue, and inter-metallic formations are also well-known causes of interconnection failures in electronic systems. Furthermore, in some systems, interconnection failures can result in undesirable phenomena in circuits, such as signal crosstalk.

In one such system, certain interconnection failures can cause signal crosstalk through circulating currents flowing onto signal lines through electrostatic discharge protection circuits. Accordingly, there is still a need for an electrostatic discharge protection circuit that reduces or eliminates the flow of circulating currents in the event of an interconnection failure.

SUMMARY

A disclosed example apparatus includes a first junction isolated clamp circuit to be coupled between a first power circuit and a signal node, the first power circuit to provide a first reference voltage, and the first clamp circuit to direct energy from the signal node to the first power circuit in response to a transient event resulting in a voltage at the signal node being lower than a second reference voltage, and a second junction isolated clamp circuit to be coupled between a second power circuit and the signal node, the second junction isolated clamp circuit comprising at least a junction isolated transistor, a collector terminal of the junction isolated transistor to be prevented from having a lower voltage than the second reference voltage, the second power circuit to provide the second reference voltage, the second reference voltage to be a lower voltage than the first reference voltage, and the second clamp circuit to direct energy from the signal node to the second power circuit in response to a transient event resulting in the voltage at the signal node being higher than the first reference voltage.

A disclosed example method includes identifying, using a processor, a first circuit electrically coupled between a signal node and a first power supply node in a circuit design data file, the first power supply node being associated with a first reference voltage; identifying, using the processor, a second circuit electrically coupled between the signal node and a second power supply node in the circuit design data file, the first reference voltage being higher than a second reference voltage associated with the second power supply node; determining, using the processor, whether any collector terminals in the second circuit may have a voltage applied that is lower than the second reference voltage; and logging an event when any of the collector terminals in the second circuit are capable of having a lower voltage than the second reference voltage.

The features, functions, and advantages that have been discussed can be achieved independently in various embodiments or may be combined in yet other embodiments, further details of which can be seen with reference to the following description and drawings.

DETAILED DESCRIPTION

Electronic systems and modern avionic subsystems may employ a number of integrated circuits (ICs) of different semiconductor processing technologies. Example semiconductor processing technologies include bipolar, complementary metal-oxide-semiconductor (CMOS), BiCMOS, Gallium Arsenide (GaAs), Gallium Nitride (GaN), and Silicon-Germanium (SiGe). Operation of ICs using these technologies may require one or more power supply circuits and/or one or more bias voltages. For example, a phased array communication antenna system can include hundreds of individual radio frequency electronic modules using CMOS ICs and/or GaAs ICs. Multiple direct current (DC) power supplies (e.g., energy sources at multiple voltages) may be required for proper operation of such a system.

Example methods and apparatus disclosed herein provide protection from transient electrical events, such as electrostatic discharge, in an IC. In known ICs, signal crosstalk between different communication lines (e.g., clock lines, serial data lines, etc.) may be caused by an electrostatic discharge (ESD) protection circuit that permits currents to flow between different signal lines (e.g., in the event of a failed interconnection, such as an interconnection to a power supply). Example methods and apparatus disclosed herein reduce or prevent circulating currents within an IC from causing signal crosstalk (e.g., in the event of an interconnection failure, such as a failure of an interconnection to a power supply), while providing protection from transient events. Example methods and apparatus disclosed herein may be advantageously used in applications requiring high reliability (e.g., aerospace applications). Examples of such high-reliability applications include applications in which interference with system operation or functionality due to interconnection failures is to be mitigated (e.g., prevented from resulting in crosstalk between communication lines).

Additionally, example methods and apparatus disclosed herein provide circuit design rule checks for data files representative of circuit layouts. Example methods and apparatus include circuit design rule checks to verify that an IC layout is provided with transient protection and/or that the IC is not subject to signal crosstalk.

Figure 1:
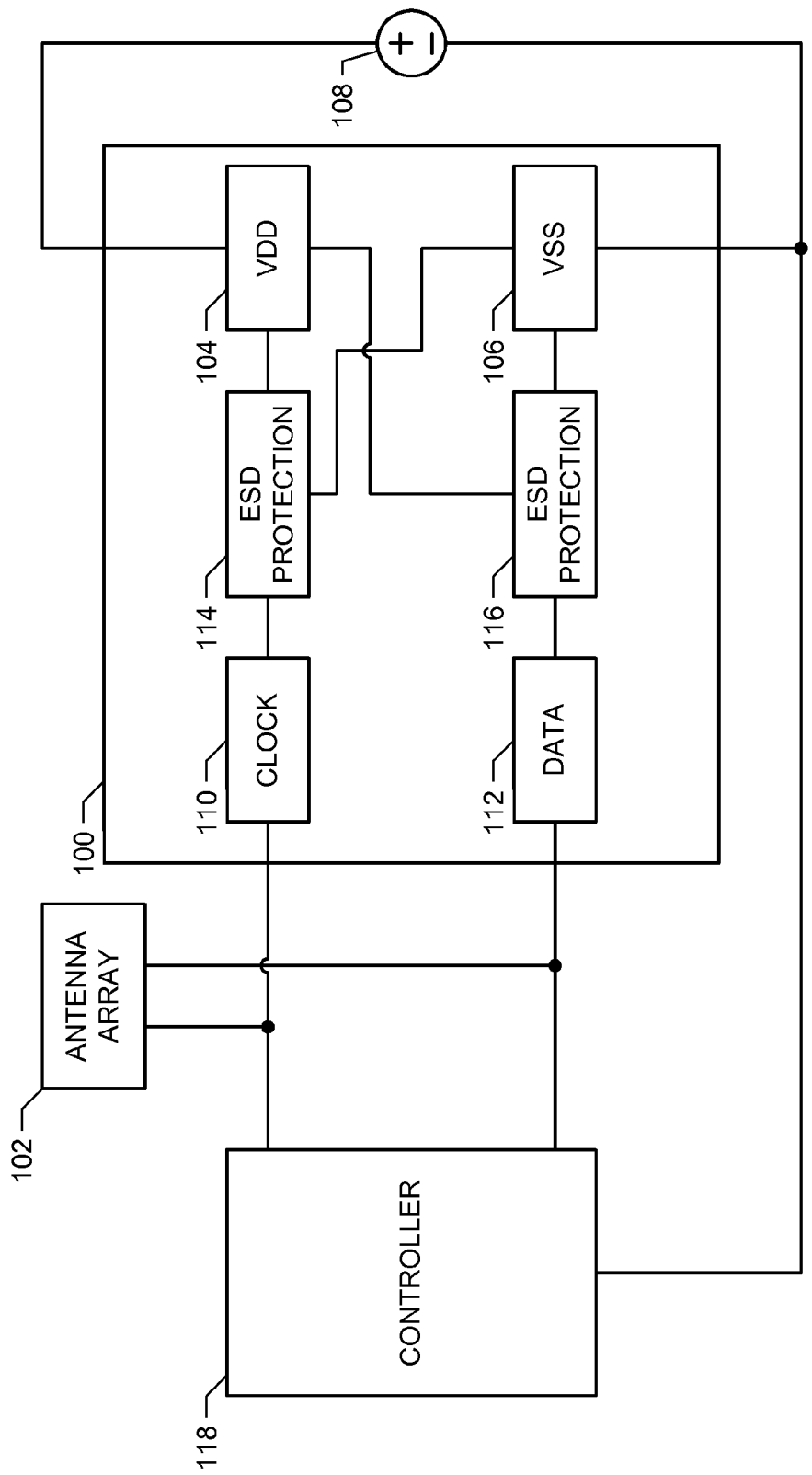
FIG. 1 is a block diagram of an example integrated circuit.

FIG. 1 is a block diagram of an example IC 100. The example IC 100 of FIG. 1 provides power and/or signals to an antenna array 102 for wirelessly communicating with remote devices. However, the example IC 100 of FIG. 1 is presented for illustration purposes and may be modified or replaced with an IC to perform any other task(s).

The IC 100 includes or is electrically coupled to an upper power circuit 104 and a lower power circuit 106. The upper and lower power circuits 104, 106 provide upper (e.g., Vdd) and lower reference voltages (e.g., Vss) derived from one or more power supplies 108. For example, the power circuits 104, 106 may scale, smooth, shift, and/or otherwise transform electrical power from the power supplies 108 (e.g., 12 volts direct current (VDC), 24 VDC, etc.) to a voltage that is more appropriate for circuitry in the IC 100 (e.g., ±1.8 VDC, ±2.2 VDC, etc.). For example, a GaAs IC may require both a positive supply and a negative supply (e.g., ±5 VDC) with respect to a common ground reference. In contrast, a CMOS IC may require only a single positive supply with respective to the CMOS ground reference.

The IC 100 of FIG. 1 includes serial communication lines for clock 110 and data 112. The communication lines 110, 112 are communicatively coupled to a controller 118 and to the antenna array 102. The communication lines 110, 112 are selectively interconnected and/or disconnected at the antenna array 102 to transmit and/or receive signals. The antenna array 102 includes an interconnect matrix including rows and columns of signal lines, of which the communication lines 110, 112 are an example.

The example IC 100 of FIG. 1 is mounted on a circuit board or a component substrate. The IC 100 is connected to the circuit board via bondwires, solder pins, and/or solder bumps on contact pads. If an interconnection between the power supply 108 and the lower power circuit 106 is broken via an open circuit (e.g., a mechanically, thermally, chemically or electrically induced failure), signals on the each of the communication lines 110, 112 may be superimposed on the signals of the other line 110, 112. Signal crosstalk may be the result of circulating currents through the IC 100 between the communication lines 110, 112. Such currents flowing through internal circuitry of the IC are not illustrated in FIG. 1. This phenomenon is commonly referred as signal crosstalk. Known ESD protection methods, such as the use of diodes and/or gate-grounded N-type metal-oxide-semiconductor (NMOS) transistors between the communication lines 110, 112 and the power circuits 104, 106, fail to protect against signal crosstalk (e.g., in the event of an interconnection failure).

The example IC 100 includes ESD protection circuits 114, 116 to protect the IC 100 from high-voltage electrostatic discharge occurring on the example communication lines 110, 112. In contrast to known methods of ESD protection, the ESD protection circuits 114, 116 of FIG. 1 provide ESD protection and also reduce or prevent crosstalk resulting from circulating currents within the IC 100. For example, the ESD protection circuits 114, 116 may be designed to prevent one or more selected nodes within the ESD protection circuits 114, 116 from exceeding a voltage range defined based on the power circuits 104, 106.

FIGS. 2A-4B illustrate example circuits and corresponding IC layouts that may be used to implement the ESD protection circuits 114, 116 of FIG. 1. However, these circuits are provided for illustration only, and many other implementations of the ESD protection circuits 114, 116 are possible.

Figure 2A:
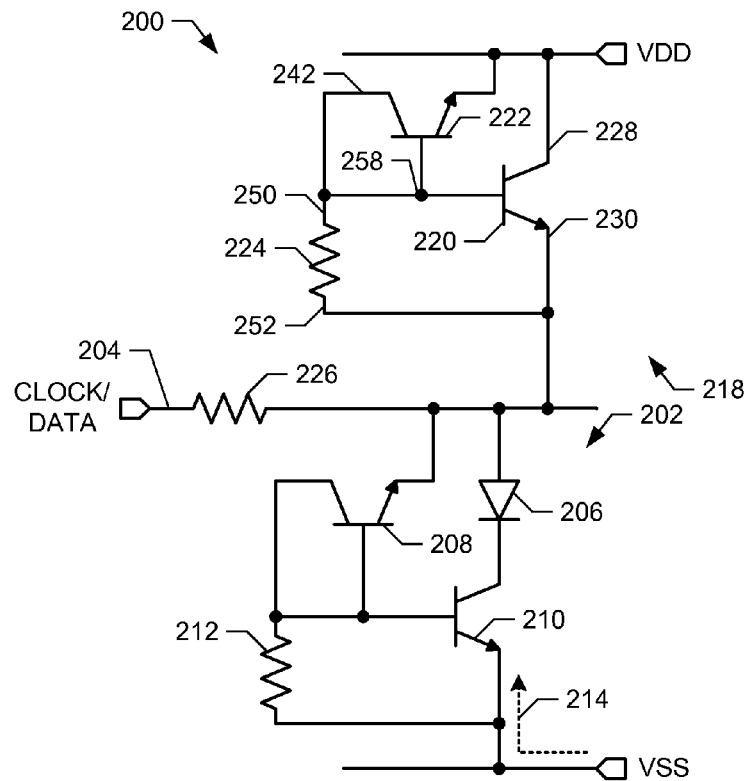
FIG. 2A is a circuit diagram of an example clamp circuit that may be used to provide electrostatic discharge protection.

FIG. 2A is a circuit diagram of an example clamp circuit 200 that may be used to provide ESD protection. The example clamp circuit 200 of FIG. 2A may implement either of the ESD protection circuits 114, 116 of FIG. 1 to protect a communication line (e.g., the communication lines 110, 112) and/or other circuitry from damage resulting from a transient event such as ESD. The example clamp circuit 200 does not influence circuit function under normal operation (e.g., no transient events being present on the communication lines 110, 112).

A lower portion 202 of the clamp circuit 200 provides ESD protection against electrostatic voltages that would cause the voltage of a communication line 204 (e.g., Clock or Data) to be higher than the upper reference voltage Vdd (if the clamp circuit 200 was not present). The example lower portion 202 includes a diode 206, first and second transistors 208, 210, and a resistor 212. The lower portion 202 is configured to prevented signal crosstalk on the communication line 204 (e.g., in the event of an interconnection failure between the reference voltage Vss and a power supply). To this end, the collector terminals of the transistors 208, 210 are not permitted to have a voltage below the Vss potential.

The collector and base terminals of the transistor 208 are connected such that the transistor 208 functions as a diode having a lower resistance and less storage time than typical diodes. The lower portion 202 of the clamp circuit 200 clamps voltage transients that are positive relative to Vss by more than the sum of the base-emitter junction breakdown voltage of the transistor 208 and the forward junction threshold voltage of the transistor 210. The base-emitter junction breakdown voltage of the transistor 208 and the forward junction threshold voltage of the transistor 210 may be selected such that their sum is higher than a voltage difference between Vdd and Vss, but below the maximum breakdown voltage of the selected IC process. The example diode 206 isolates the collector terminal of the transistor 210 from negative transients on the communication line 204. The resistor 212 is a bleed resistor that provides a high-resistance path for the base-emitter junction of the transistor 210. The example resistor 212 may be included to improve performance of the lower portion 202 in high-temperature environments.

In the event the lower power circuit providing the reference voltage Vss fails (e.g., is disconnected from a power supply, open-circuited, etc.), the example lower portion 202 reduces or prevents crosstalk signals 214 from affecting the communication line 204. In the example of FIG. 2A, the resistor 212 and the forward junction threshold voltage of the transistor 208 prevent a small crosstalk signal 214 from affecting the communication line 204. In other examples (e.g., in normal and/or lower-temperature environments), the example resistor 212 may be omitted from the lower portion 202 and the base-emitter junction breakdown voltage of the transistor 210 prevents the crosstalk signals from affecting the communication line 204.

An upper portion 218 of the clamp circuit 200 of FIG. 2A provides ESD protection against electrostatic voltages that would cause the voltage of the communication line 204 (e.g., a signal node, such as Clock or Data) to be less than the voltage Vss (if the clamp circuit 200 was not present). The example upper portion 218 includes first and second transistors 220, 222 and a resistor 224.

To clamp the communication line 204, the upper portion 218 clamps voltage transients that are negative relative to Vdd by more than the sum of the base-emitter junction breakdown voltage of the transistor 222 and the forward junction threshold voltage of the transistor 220. The transistors 220, 222 are configured such that the sum of the base-emitter junction breakdown voltage of the transistor 222 and the forward junction threshold voltage of the transistor 220 is greater than Vdd but below the breakdown voltage of the selected IC process. The resistor 224 is a bleed resistor that provides a high-resistance path for the base-emitter junction of the transistor 220.

The example clamp circuit 200 further includes a current-limiting resistor 226. The resistor 226 limits a current flow from the communication line 204 through the clamp circuit 200 due to an ESD event.

If a transient event occurs that would cause the voltage on the communication line 204 to increase above Vdd, the voltage difference between the communication line 204 and the reference voltage Vss causes a breakdown of the base-emitter junction of the transistor 208. The voltage caused by the transient event further causes current to flow through the resistor 212 and/or forward biases the base-emitter junction of the transistor 210 to provide a current path from the communication line 204 to the power circuit providing the reference voltage Vss, thereby clamping the voltage on the communication line 204. Conversely, if the transient event would cause the voltage on the communication line 204 to decrease below Vss, the voltage difference between the communication line 204 and the reference voltage Vdd causes a breakdown of the base-emitter junction of the transistor 222. The voltage caused by the transient event further causes current to flow through the resistor 224 and/or forward biases the base-emitter junction of the transistor 220 to provide a current path from the power circuit providing the reference voltage Vdd to the communication line 204, thereby clamping the voltage on the communication line 204.

Figure 2B:
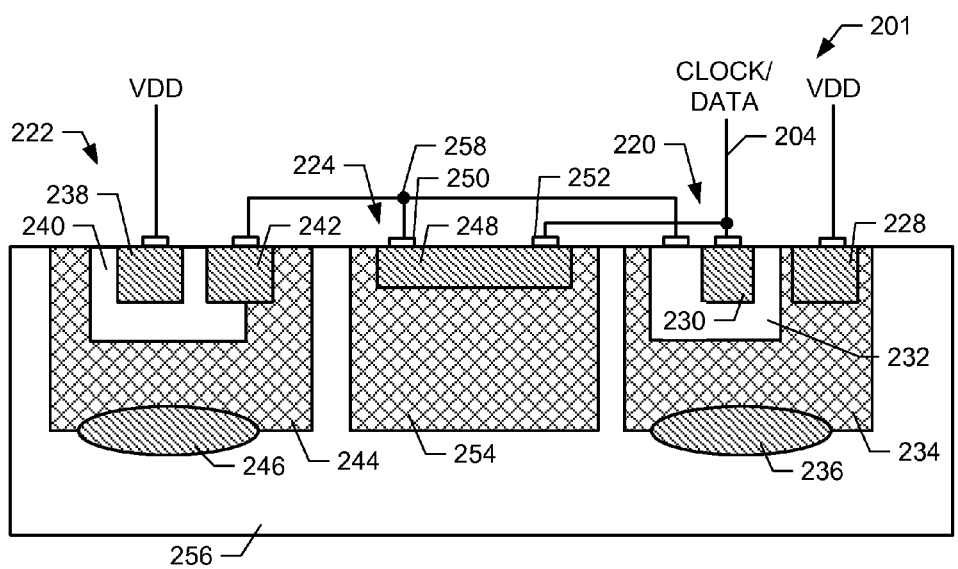
FIG. 2B is an example integrated circuit layout for a portion of the example clamp circuit of FIG. 2A.

FIG. 2B is an example IC layout 201 for the upper portion 218 of the example clamp circuit 200 of FIG. 2A. The upper portion 218 of the clamp circuit 200 may be arranged in an IC using the IC layout 201 of FIG. 2B. The IC layout 201 represents a construction using a junction isolated IC process. A junction isolated IC process is an IC fabrication process that electrically isolates components in the IC using reverse-biased p-n semiconductor junctions. Like reference numerals are used in FIG. 2B to illustrate the corresponding elements of FIG. 2A.

The transistor 220 illustrated in FIG. 2B includes a first n+ doped terminal 228 (e.g., the collector terminal) and a second n+ doped terminal 230 (e.g., the emitter terminal) within a p doped portion 232 (e.g., the base terminal). The transistor 220 further includes an n-epitaxy layer 234 and an n+ doped barrier layer 236. The terms "n+" and "p+" doping refer to a relatively higher concentration or amount of doping than "n" or "p" doping, respectively. Conversely, the terms "n−" and "p−" doping refer to a relatively lower concentration or amount of doping than "n" or "p" doping, respectively.

The transistor 222 illustrated in FIG. 2B includes a first n+ doped terminal 238 (e.g., the emitter terminal) within a p doped portion 240 (e.g., the base terminal) and a second n+ doped terminal 242 (e.g., the collector terminal) adjacent the p doped portion 240. The transistor 222 further includes an n-epitaxy layer 244 and an n+ doped barrier layer 246. In contrast to the transistor 222, the transistor 220 includes an amount of the n-epitaxy layer 244 between the collector terminal 228 and the base terminal 232 (e.g., a gap), while the p doped portion 240 and the second n+ doped terminal 242 are adjacent and are electrically connected.

The resistor 224 illustrated in FIG. 2B includes an n+ doped portion 248 to provide a desired resistance. The n+ doped portion 248 includes a first terminal 250 and a second terminal 252, and the resistance lies between the terminals 250, 252. The n+ doped portion 248 is within an n-epitaxy layer 254.

The transistors 220, 222 and the resistor 224 of FIG. 2B are included within a p doped substrate 256. As illustrated in FIGS. 2A-2B, the terminals 232, 242, and 250 are coupled to a common node 258. The terminals 228 and 238 are coupled to Vdd, and the terminals 230 and 252 are coupled to the communication line 204 (e.g., Clock, Data). The n-epitaxy layers 234, 244, 254 provide junction isolation.

Figure 3A:
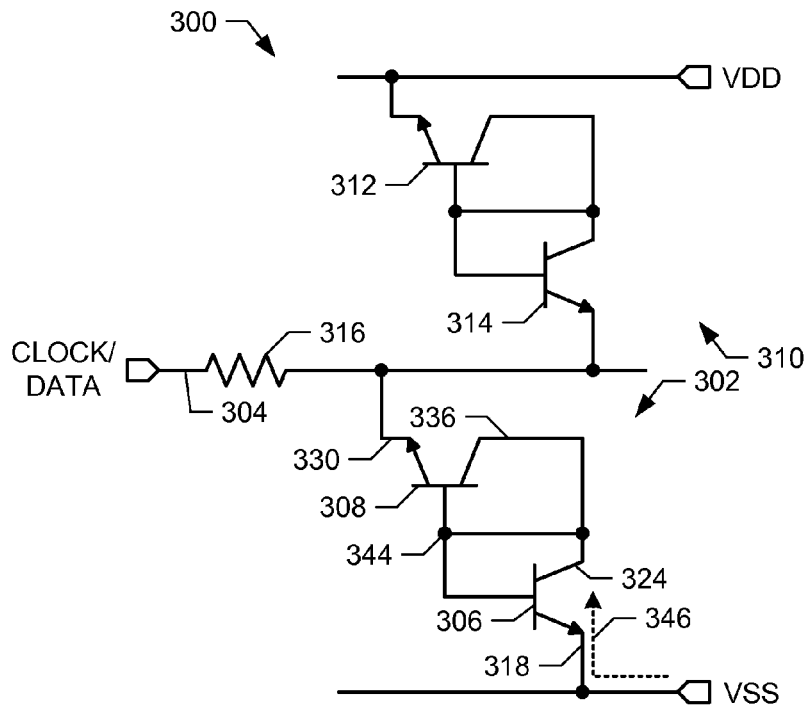
FIG. 3A is a circuit diagram of an example clamp circuit that may be used to provide electrostatic discharge protection.
Figure 3B:
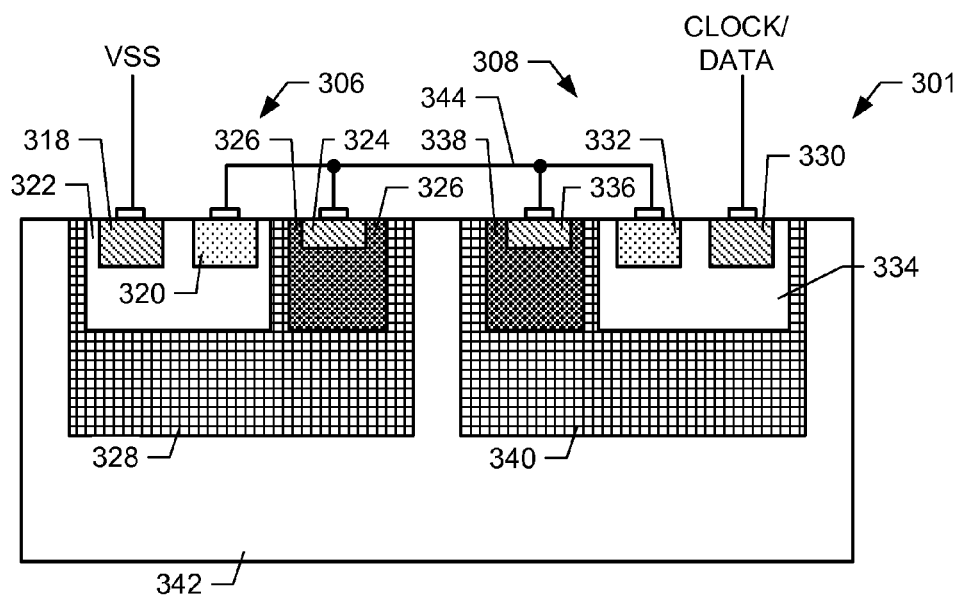
FIG. 3B is an example integrated circuit layout for a portion of the example clamp circuit of FIG. 3A.

FIG. 3A is a circuit diagram of an example clamp circuit 300 that may be used to provide ESD protection. FIG. 3B is an example integrated circuit layout 301 for a lower portion 302 of the example clamp circuit 300 of FIG. 3A. The example clamp circuit 300 of FIG. 3A may implement either of the ESD protection circuits 114, 116 of FIG. 1 to protect a communication line 304 from damage resulting from ESD. The example clamp circuit 300 does not act under normal operation.

The lower portion 302 of the clamp circuit 300 includes transistors 306, 308. The base and collector terminals of the transistors 306, 308 are electrically connected, such that the transistors 306, 308 function as diodes having lower resistance and less storage time than typical diodes. The lower portion 302 of the clamp circuit 300 provides ESD protection from electrostatic voltages that would cause the voltage of the communication line 304 (e.g., Clock or Data) to be higher than the reference voltage Vdd (e.g., if the clamp circuit 300 was not present))) by more than the sum of the base-emitter junction breakdown voltage of the transistor 308 and forward junction threshold voltage of the transistor 306.

An upper portion 310 of the clamp circuit 300 includes transistors 312, 314. The base and collector terminals of the transistors 312, 314 are electrically connected to serve as diodes having lower resistance and less storage time than typical diodes. The upper portion 310 clamps voltage transients that are negative relative Vdd by more than the sum of the base-emitter junction breakdown voltage of the transistor 312 and the base-emitter forward junction threshold voltage of the transistor 314. The sum of the base-emitter junction breakdown voltage of the transistor 308 and the base-emitter forward junction threshold voltage of the transistor 306, and/or the sum of the base-emitter junction breakdown voltage of the transistor 312 and the base-emitter forward junction threshold voltage of the transistor 314 are configured to be greater than a difference between Vdd and Vss, but below the breakdown voltage of the selected IC process (e.g., a junction isolated process).

The example clamp circuit 300 further includes a current-limiting resistor 316. The resistor 316 limits a current flow from the communication line 304 through the clamp circuit 300 due to an ESD event.

If a transient event occurs that would cause the voltage on the communication line 304 to increase above Vdd, the voltage difference between the communication line 304 and the reference voltage Vss causes a breakdown of the base-emitter junction of the transistor 308. The voltage caused by the transient event also forward biases the base-emitter junction of the transistor 306 to provide a current path from the communication line 304 to the power circuit providing the reference voltage Vss, thereby clamping the voltage on the communication line 304. Conversely, if the transient event would cause the voltage on the communication line 304 to decrease below Vss, the voltage difference between the communication line 304 and the reference voltage Vdd causes a breakdown of the base-emitter junction of the transistor 312. The voltage caused by the transient event also forward biases the base-emitter junction of the transistor 314 to provide a current path from the power circuit providing the reference voltage Vdd to the communication line 304, thereby clamping the voltage on the communication line 304.

The lower portion 302 of the clamp circuit 300 may be arranged in an IC using the IC layout 301 of FIG. 3B. The IC layout 301 represents a construction using a junction isolated IC process. Like reference numerals are used in FIG. 3B to illustrate the corresponding elements of FIG. 3A.

The transistor 306 of FIG. 3B includes an n+ doped terminal 318 (e.g., an emitter terminal) and a p+ doped terminal 320 (e.g., a base terminal) within a p well 322. The emitter terminal 318 is coupled to the lower power supply circuit Vss. The transistor 306 further includes an n+ doped terminal 324 (e.g., a collector terminal) within an n well 326. The transistor 306 is formed within a deep n well 328.

The transistor 308 of FIG. 3B is similar or identical to the transistor 306, and includes an n+ doped terminal 330 (e.g., an emitter terminal) and a p+ doped terminal 332 (e.g., a base terminal) within a p well 334. The emitter terminal 330 is coupled to the communication line 304 (e.g., Clock, Data). The transistor 308 further includes an n+ doped terminal 336 (e.g., a collector terminal) within an n well 338. The transistor 308 is formed within a deep n well 340. The deep n wells 328, 340 provide junction isolation.

The transistors 306, 308 are included within a p doped substrate 342. As illustrated in FIGS. 3A-3B, the base and collector terminals 320, 324, 332, and 336 are coupled to a common node 344. The terminal 318 is coupled to Vss, and the terminal 330 is coupled to the communication line 304 (e.g., Clock, Data).

In the event the lower power circuit providing the reference voltage Vss fails (e.g., is disconnected from a power supply, open-circuited, etc.), the base-emitter junction breakdown voltage of the transistor 306 prevents crosstalk signals 346 from affecting the communication line 304 via the lower portion 302 of the circuit 300.

Figure 4A:
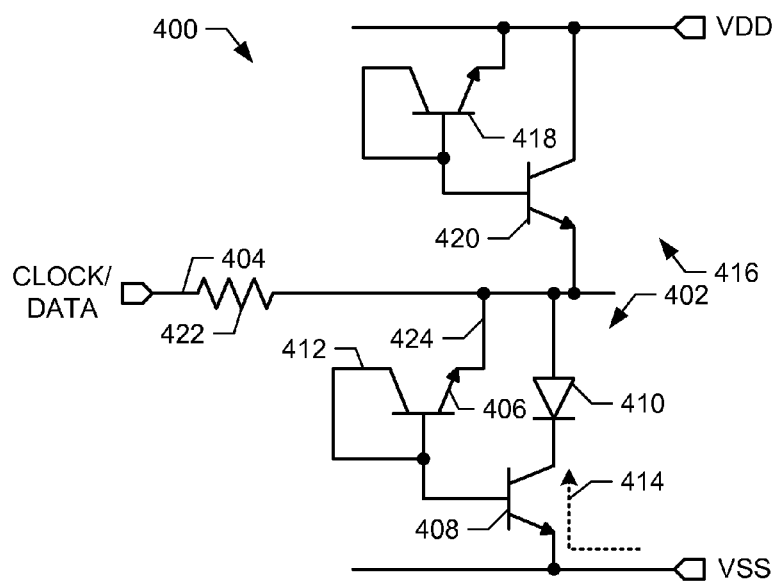
FIG. 4A is a circuit diagram of an example clamp circuit that may be used to provide electrostatic discharge protection.
Figure 4B:
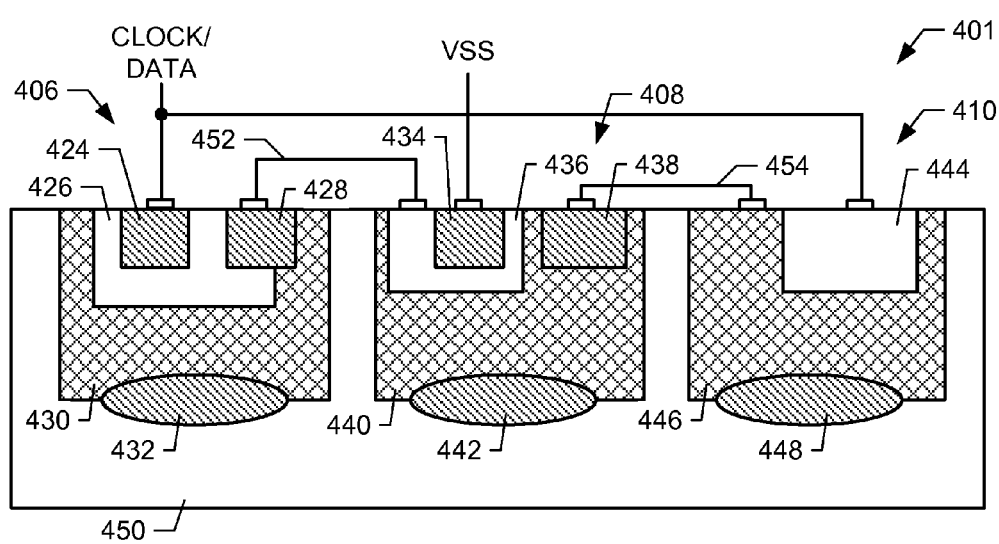
FIG. 4B is an example integrated circuit layout for a portion of the example clamp circuit of FIG. 4A.

FIG. 4A is a circuit diagram of an example clamp circuit 400 that may be used to provide ESD protection. FIG. 4B is an example integrated circuit layout 401 for a lower portion 402 of the example clamp circuit 400 of FIG. 4A. The example clamp circuit 400 of FIG. 4A may implement either of the ESD protection circuits 114, 116 of FIG. 1 to protect a communication line 404 from damage resulting from ESD. The example clamp circuit 400 does not act under normal operation.

The lower portion 402 of the clamp circuit 400 provides ESD protection against electrostatic voltages that would cause the voltage of a communication line 404 (e.g., Clock or Data) to be higher than the voltage Vdd (if the clamp circuit 400 was not present). The example lower portion 402 includes transistors 406, 408 and diode 410. The example lower portion 402 is configured such that collector terminals of the transistors 406, 408 are not permitted to have voltages less than Vss. The collector and base terminals of the transistor 406 are connected to the base terminal of the transistor 408. The example diode 410 isolates the collector terminal of the transistor 408 from negative transients on the communication line 404.

An upper portion 416 of the clamp circuit 400 of FIG. 4A provides ESD protection against electrostatic voltages that would cause the voltage of the communication line 404 (e.g., Clock or Data) to be less than the voltage Vss (if the clamp circuit 400 was not present). The example upper portion 416 includes transistors 418, 420.

To clamp the communication line 404, the upper portion 416 clamps voltage transients that are negative relative to Vdd by more than the sum of the base-emitter junction breakdown voltage of the transistor 418 and the forward junction threshold voltage of the transistor 420. The transistors 418, 420 are configured such that the sum of the base-emitter junction breakdown voltage of the transistor 418 and the forward junction threshold voltage of the transistor 420 is greater than Vdd but below the breakdown voltage of the selected IC process.

The example clamp circuit 400 further includes a current-limiting resistor 422. The resistor 422 limits a current flow from the communication line 404 through the clamp circuit 400 due to an ESD event.

If a transient event occurs that would cause the voltage on the communication line 404 to increase above Vdd, the voltage difference between the communication line 404 and the reference voltage Vss causes a breakdown of the base-emitter junction of the transistor 406. The voltage caused by the transient event also forward biases the base-emitter junction of the transistor 408 to provide a current path from the communication line 404 to the power circuit providing the reference voltage Vss, thereby clamping the voltage on the communication line 404. Conversely, if the transient event would cause the voltage on the communication line 404 to decrease below Vss, the voltage difference between the communication line 404 and the reference voltage Vdd causes a breakdown of the base-emitter junction of the transistor 418. The voltage caused by the transient event also forward biases the base-emitter junction of the transistor 420 to provide a current path from the power circuit providing the reference voltage Vdd to the communication line 404, thereby clamping the voltage on the communication line 404.

In the event the lower power circuit providing the reference voltage Vss fails (e.g., is disconnected from a power supply, open-circuited, etc.), the base-emitter junction breakdown voltage of the transistor 408 prevents crosstalk signals 414 from affecting the communication line 404 via the lower portion 402 of the circuit 400.

As illustrated in FIG. 4B, the example transistor 406 includes a first n+ doped terminal 424 (e.g., the emitter terminal) within a p doped portion 426 (e.g., the base terminal) and a second n+ doped terminal 428 (e.g., the collector terminal) adjacent the p doped portion 426. The transistor 406 further includes an n-epitaxy layer 430 and an n+ doped barrier layer 432.

The transistor 408 illustrated in FIG. 4B includes a first n+ doped terminal 434 (e.g., the emitter terminal) within a p doped portion 436 (e.g., the base terminal) and a second n+ doped terminal 438 (e.g., the collector terminal). The transistor 408 further includes an n-epitaxy layer 440 and an n+ doped barrier layer 442. In contrast to the transistor 406, the transistor 408 includes an amount of the n-epitaxy layer 440 between the collector terminal 438 and the base terminal 436 (e.g., a gap), while the p doped portion 426 and the second n+ doped terminal 428 are adjacent and are electrically connected.

The diode 410 illustrated in FIG. 4B includes a p+ doped portion 444 within an n-epitaxy layer 446. The p+ doped portion 444 and the n-epitaxy layer 446 provide a p-n junction. The diode 410 further includes an n+ doped barrier layer 448.

The transistors 406, 408 and the diode 410 of FIG. 4B are included within a p doped substrate 450. As illustrated in FIGS. 4A-4B, the terminals 428 and 436 are coupled to a common node 452, and the terminals 438, 446 are coupled to a common node 454. The terminals 424, 444 are coupled to the communication node 404 (e.g., Clock, Data), and the terminal 434 is coupled to Vss.

Any of the example IC layouts 201, 301, 401, and/or complementary circuits thereof, may be combined to obtain IC layouts to protect against high-voltage and low-voltage transient events. For example, the layout 201 of FIG. 2B may be combined with either of the layout 301 of FIG. 3B or the layout 401 of FIG. 4B to construct a clamp circuit in an IC. As another example, the example IC layout 301 of FIG. 3B may be modified to be used as an upper portion of a clamp circuit by connecting the terminal 330 to VDD and connecting the terminal 318 to the corresponding communication line. The resulting upper portion may then be combined with a lower portion such as the IC layouts 301, 401 to construct a clamp circuit in an IC.

The example IC 100 of FIG. 1, the example clamp circuits 200, 300, 400 of FIGS. 2A-4B, and/or the example IC layouts 201, 301, 401 may be evaluated and/or tested for compliance with design rules via automated circuit design rule checks. Circuit design rule checks are performed on a data file that describes a proposed integrated circuit layout design, such as the example layouts 201, 301, 401 of FIGS. 2B, 3B, and/or 4B. In some examples, a computer or other processing platform may obtain an integrated circuit data file. Such integrated circuit files may be compatible with and/or generated by circuit design tools such as tools provided by Cadence, Synopsys, and/or others. The example IC layout 201, 301, 401 of FIGS. 2B-4B may be checked via a circuit design rule check to determine, for example, that the layouts 201, 301, 401 provide transient event (e.g., ESD) protection and/or that signal crosstalk is not experienced by the communication lines 204, 304, 404 via the layouts 201, 301, 401.

The processor identifies nodes in the data file that are to be checked for compliance with ESD protection rules, such as rules to provide ESD protection illustrated by the example clamp circuits 200-400 described above. The ESD protection design rules are described in a circuit design rule check language. Example design rules to provide ESD protection via the example clamp circuits described above may specify that a collector terminal of a junction isolated transistor is not permitted to have a lower voltage than the voltage of the lower-voltage power rail (e.g., at any time and/or in response to the circuit being subjected to a transient voltage). Additionally or alternatively, the design rules may require that a circuit is required to have at least a forward-biased base-emitter junction and a reverse biased base-emitter junction between a communications line (e.g., a clock signal, a serial data signal, etc.) and the reference voltage nodes (e.g., the power supply circuits).

Figure 5:
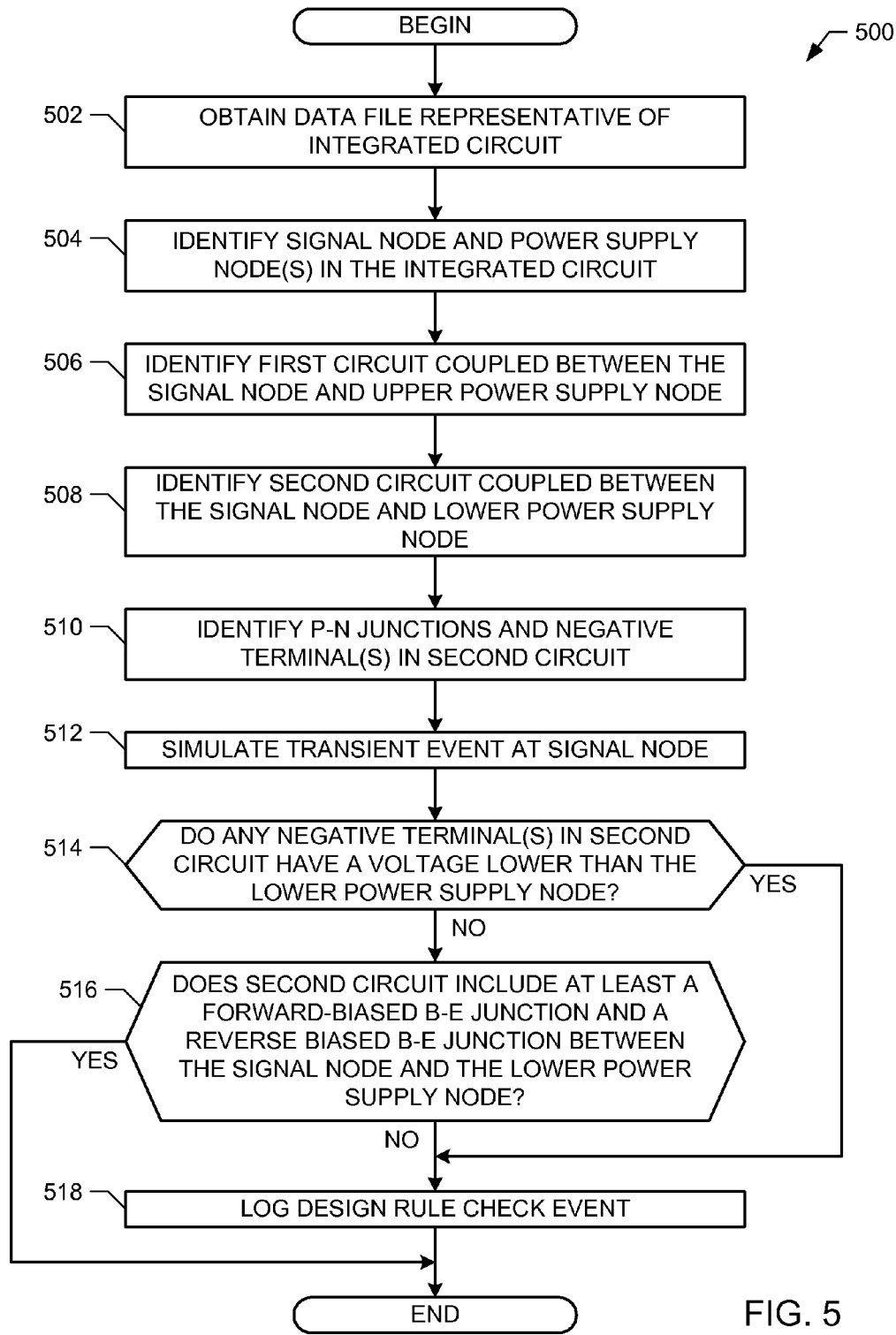
FIG. 5 is a flowchart representative of an example method to execute a circuit design rule check.
Figure 6:
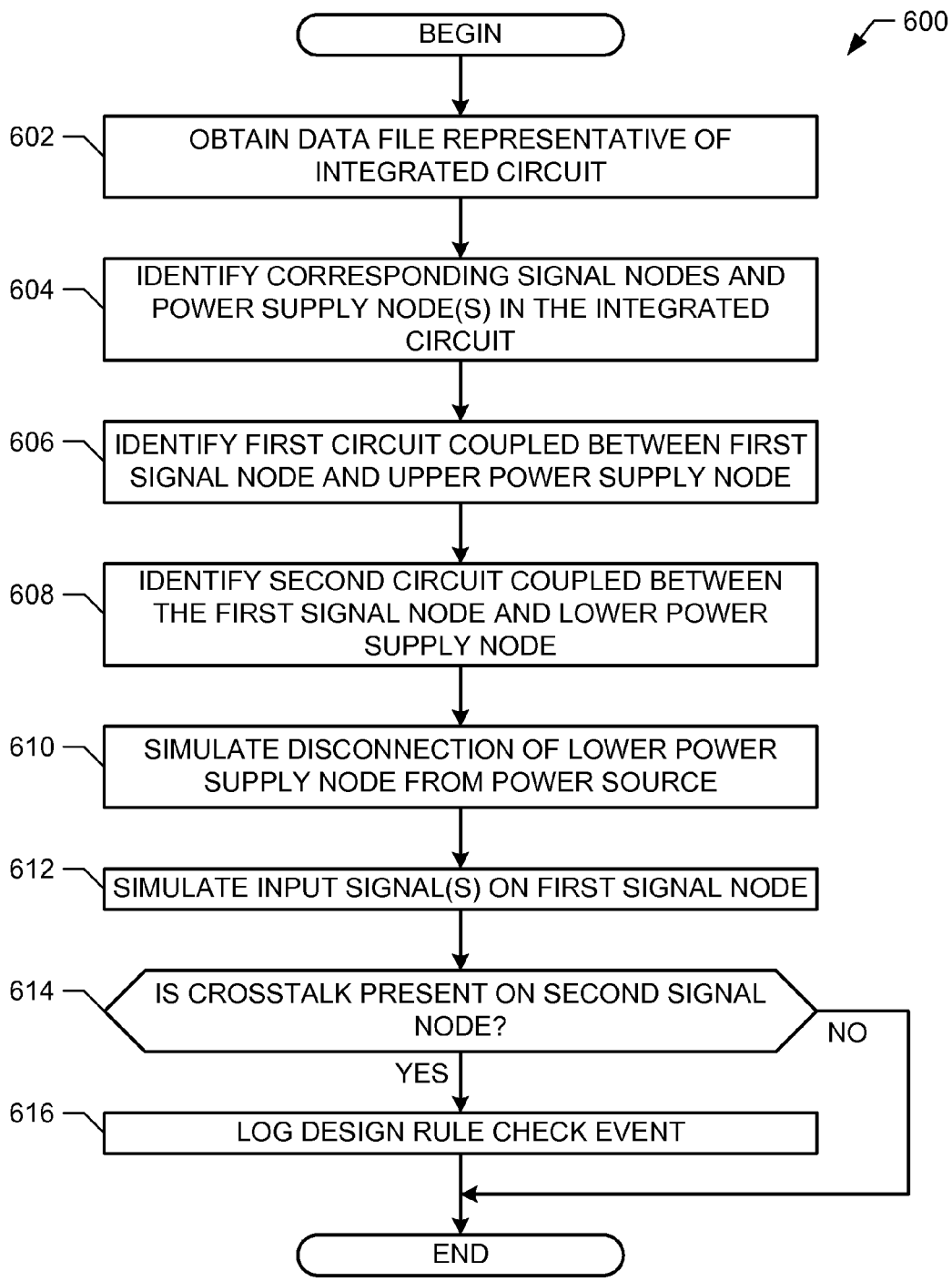
FIG. 6 is a flowchart representative of another example method to execute a circuit design rule check.

Flowcharts representative of example methods for performing circuit design rule checks for the circuits 200, 300, 400 of FIGS. 2A-4B are shown in FIGS. 5 and 6. In these examples, the methods may be implemented by machine readable instructions comprising programs for execution by a processor such as the processor 912 shown in the example processor platform 900 discussed below in connection with FIG. 9. The programs may be embodied in software stored on a tangible computer readable storage medium such as a CD-ROM, a floppy disk, a hard drive, a digital versatile disk (DVD), a Blu-ray disk, or a memory associated with the processor 912, but the entire programs and/or parts thereof could alternatively be executed by a device other than the processor 912 and/or embodied in firmware or dedicated hardware. Further, although the example programs are described with reference to the flowcharts illustrated in FIGS. 5 and/or 6, many other methods of performing circuit design rule checks may alternatively be used. For example, the order of execution of the blocks may be changed, and/or some of the blocks described may be changed, eliminated, or combined.

As mentioned above, the example methods of FIGS. 5 and/or 6 may be implemented using coded instructions (e.g., computer readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable storage medium is expressly defined to include any type of computer readable storage and to exclude propagating signals. Additionally or alternatively, the example methods of FIGS. 5-7 may be implemented using coded instructions (e.g., computer readable instructions) stored on a non-transitory computer readable storage medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable storage medium is expressly defined to include any type of computer readable storage medium and to exclude propagating signals. As used herein, when the phrase "at least" is used as the transition term in a preamble of a claim, it is open-ended in the same manner as the term "comprising" is open ended.

FIG. 5 is a flowchart representative of an example method 500 to execute a circuit design rule check. The example method 500 of FIG. 5 may be implemented by a computer or other processing platform (e.g., the processing platform 900 of FIG. 9) to determine whether a circuit represented by a data file provides ESD protection.

The example method 500 begins by obtaining a data file representative of an IC (block 502). For example, the data file containing an IC layout may be loaded from a storage device or received via a network connection. The example processor identifies a signal node (e.g., the communication lines 204, 304, 404 of FIGS. 2A-4B) and power supply node(s) (e.g., Vss, Vdd) in the integrated circuit (block 504). In the examples disclosed herein, the integrated circuit includes two different power supply reference voltages Vss and Vdd.

The example processor identifies a first circuit coupled between the signal node and an upper power supply node (e.g., Vdd) (block 506). The example processor also identifies a second circuit coupled between the signal node and lower power supply node (e.g., Vss) (block 508). An integrated circuit may have multiple circuits or sub-circuits coupled to both the identified signal line and the upper power supply node and/or multiple circuits or sub-circuits coupled to both the identified signal line and the lower power supply node. The first and/or second circuits may be identified from the multiple circuits or sub-circuits in the IC based on input from a user (e.g., a circuit designer) and/or based on an identification of circuit components and/or characteristics of the first circuit (e.g., types and/or patterns of components, layers, junctions, and/or contacts) coupled between the first circuit and the upper power supply node.

The processor identifies p-n junctions and negative terminal(s) of the p-n junctions in the second circuit (block 510). Identification of p-n junctions and negative terminals in block 510 may be performed for ICs to be constructed using a junction process. In other examples, block 510 may be modified to identify other types of junctions, layers, and/or contacts for other IC process methods.

The processor simulates a transient event occurring at the signal node (block 512). For example, the processor determines the response of the IC based on the IC being subjected to a transient event, such as ESD, via the signal node. The transient event may be a positive-voltage transient event or a negative-voltage transient event. In the example method 500, the processor simulates at least a positive-voltage transient event to test the response of the second circuit. The processor determines whether any negative terminal(s) (e.g., negative terminals of p-n junctions, collector terminals of junction process transistors) in the second circuit have (e.g., are subjected to) a voltage that is lower than the voltage of the lower power supply node Vss (block 514). For example, the processor may determine whether any negative terminal(s) have a more negative voltage than the lower power supply node Vss at any time before, during, and/or after the transient event.

If none of the negative terminal(s) in the second circuit have a voltage lower than that of the lower power supply node (block 514), the processor determines whether the second circuit includes at least a forward-biased base-emitter junction and a reverse biased base-emitter junction between the signal node and the lower power supply node (block 516). In the example of FIG. 5, the processor may further specify that the forward-biased base-emitter junction and a reverse biased base-emitter junction are to have a particular arrangement, such as being configured in series between the signal node and the lower power supply node. Additionally or alternatively, the processor may determine that another arrangement of junctions, layers, and/or components is present that provides protection against transient events.

If there is at least one negative terminal in the second circuit that can have a voltage lower than the voltage of the lower power supply node Vss (block 514), or if the second circuit does not include at least a forward-biased base-emitter junction and a reverse biased base-emitter junction between the signal node and the lower power supply node Vss (block 516), the example processor logs a design rule check event (block 518). The design rule check event may include an error, a warning, or another notification to a user or designer performing the design rule check of the IC that the IC does not comply with a design rule requiring protection of the IC against transient events.

If none of the negative terminal(s) in the second circuit have a voltage lower than that of the lower power supply node (block 514) and the second circuit includes at least a forward-biased base-emitter junction and a reverse biased base-emitter junction between the signal node and the lower power supply node Vss (block 516), the example processor may determine that the IC complies with the transient event protection design rule check and does not log an event. After logging the design rule check event (block 518) or not logging the event, the example method 500 ends. In some examples, the processor continues to perform design rule checks for additional design rules and/or iterates the method 500 to perform the transient event protection design rule check for another IC.

FIG. 6 is a flowchart representative of an example method 600 to execute a circuit design rule check. The example method 600 of FIG. 6 may be implemented by a computer or other processing platform (e.g., the processing platform 900 of FIG. 9) to determine whether a circuit represented by a data file is protected from signal crosstalk. The method 600 may be used in conjunction with the example method 500 of FIG. 5 to, for example, verify that an IC is protected from transient events and is not subject to signal crosstalk.

The example method 600 begins by obtaining a data file representative of an IC (block 602). For example, the data file containing an IC layout may be loaded from a computer readable storage (e.g., the memories 913, 914, 916 and/or the mass storage device 928 of FIG. 9) or received via a network connection (e.g., the interface 920 of FIG. 9). The example processor identifies a signal node (e.g., the signal nodes 204, 304, 404 of FIGS. 2A-4B) and power supply node(s) (e.g., Vss, Vdd) in the integrated circuit (block 604). In the examples disclosed herein, the integrated circuit includes two different power supply reference voltages Vss and Vdd. The example processor identifies a first circuit coupled between the signal node and an upper power supply node (e.g., Vdd) (block 606). The example processor also identifies a second circuit coupled between the signal node and lower power supply node (e.g., Vss) (block 608). Blocks 602-608 of FIG. 6 may be similar or identical to corresponding blocks 502-508 of FIG. 5.

The processor simulates a disconnection of the lower power supply node (e.g., Vss) from a corresponding power source (block 610). For example, block 610 may simulate the circumstance where a lower power supply circuit is electrically disconnected (e.g., open-circuited) from a power source that supplies electrical power to the lower power supply circuit. The processor simulates input signal(s) being received on a first one of the identified signal nodes (e.g., a clock signal, a data signal, etc.) (block 612). The processor determines (e.g., via simulation of the IC) whether crosstalk is present on a second one of the signal nodes (block 614). For example, the processor may determine whether there are any paths through which a circulating current may cause the signal on the first signal node to cause crosstalk on the second signal node.

If crosstalk is determined to be present on the second signal node (block 614), the example processor logs a design rule check event (block 616). The design rule check event may include an error, a warning, or another notification to a user or designer performing the design rule check of the IC that the IC does not comply with a design rule that signal crosstalk is to be prevented (e.g., in the case of power supply disconnection). After logging the design rule check event (block 616), or if crosstalk is not present on the second signal node(s) (block 614), the example method 600 may end or iterate to perform the design rule check for other parts of the IC.

Figure 7:
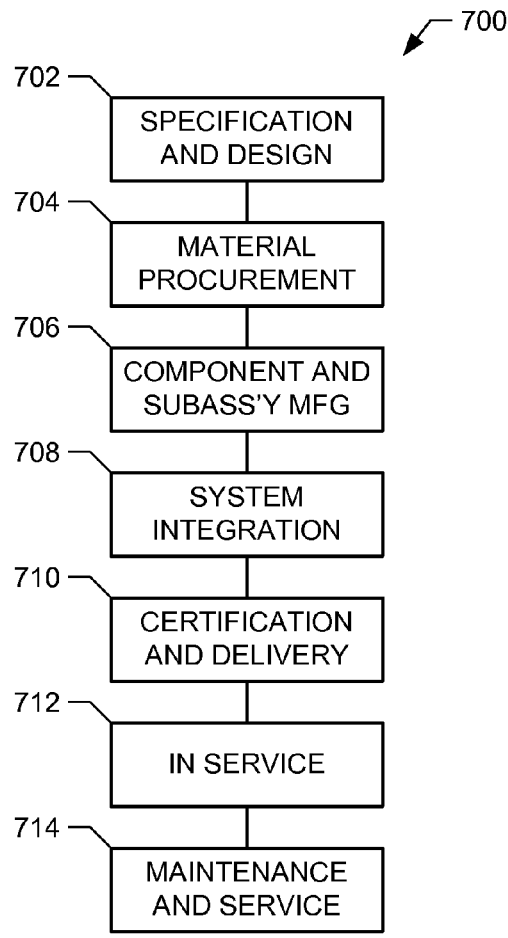
FIG. 7 is a flowchart of platform production and service methodology.
Figure 8:
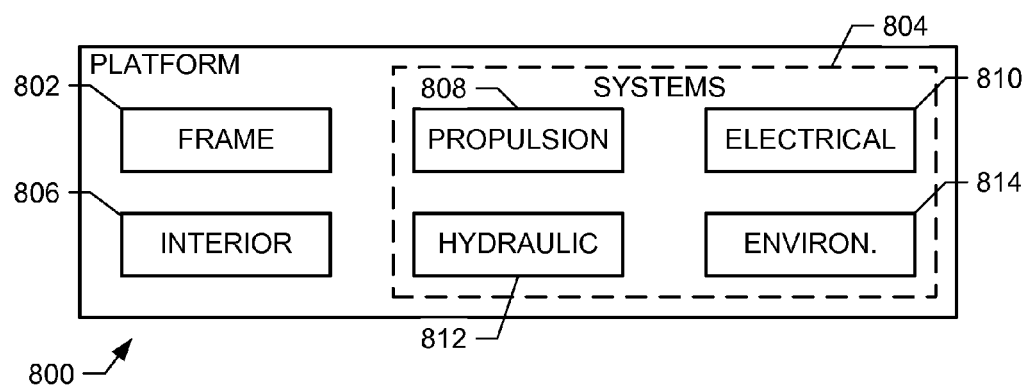
FIG. 8 is a block diagram of a platform.

Examples of the disclosure may be described in the context of a platform manufacturing and service method 700 as shown in FIG. 7 and a platform 800, such as an aircraft and/or a spacecraft, as shown in FIG. 8. Platform manufacturing and service method 700 and platform 800 may contain large quantities of IC's, which may be connected by communication data buses that are subject to transient events in their intended field applications. During pre-production, the example method 700 may include specification and design (block 702) of the platform 800 (e.g., an aircraft, a spacecraft), such as the placement(s) and/or design(s) of the example IC 100, the example antenna array 102, the example power supplies 108, and/or the example controller 118. Pre-production may further include performing design rule checks of ICs to be included on the platform 800, such as design rule checks for transient event protection of the ICs and/or for reduction and/or prevention of signal crosstalk in the ICs. Pre-production may further include material procurement (block 704). During production, component and subassembly manufacturing (block 706) and system integration (block 708) of the platform 800 (e.g., an aircraft, a spacecraft) takes place. During component and subassembly manufacturing (block 706) and/or system integration (block 708), the example IC 100, the example antenna array 102, the example power supplies 108, and/or the example controller 118 may be attached (e.g., affixed) to structural locations. Thereafter, the platform 800 (e.g., an aircraft, a spacecraft) may go through certification and delivery (block 710) in order to be placed in service (block 712). While in service by a customer, the platform 800 (e.g., an aircraft, a spacecraft) is scheduled for routine maintenance and service (block 714), which may also include modification, reconfiguration, refurbishment, etc.

Each of the operations of the example method 700 may be performed or carried out by a system integrator, a third party, and/or an operator (e.g., a customer). For the purposes of this description, a system integrator may include without limitation any number of platform (e.g., aircraft) manufacturers and major-system subcontractors; a third party may include without limitation any number of venders, subcontractors, and suppliers; and an operator may be an airline, leasing company, military entity, service organization, and so on.

As shown in FIG. 8, the platform 800 (e.g., an aircraft, a spacecraft) produced by example method 700 may include a frame 802 with a plurality of systems 804 and an interior 806. Examples of high-level systems 804 include one or more of a propulsion system 808, an electrical system 810, a hydraulic system 812, and an environmental system 814. The example methods and apparatus disclosed herein may be integrated into the example systems 808-814 to prevent data bus contamination from signal cross talk on data buses as a result of an interconnection failure of an individual IC within the components of the systems 808-814. Example methods and apparatus disclosed herein further isolate individual components of the systems 808-814 after corresponding IC interconnections have failed in field applications. Any number of other systems may be included.

Apparatus and methods embodied herein may be employed during any one or more of the stages of the production and service method 700. For example, components or subassemblies corresponding to production process 706 may be fabricated or manufactured in a manner similar to components or subassemblies produced while the platform 800 (e.g., an aircraft, a spacecraft) is in service 712. Also, one or more apparatus embodiments, method embodiments, or a combination thereof may be implemented during the production stages 706 and 708, for example, by substantially expediting assembly of or reducing the cost of a platform 800 (e.g., an aircraft, a spacecraft). Similarly, one or more of apparatus embodiments, method embodiments, or a combination thereof may be utilized while the platform 800 (e.g., an aircraft, a spacecraft) is in service 712, for example and without limitation, to maintenance and service 714.

Figure 9:
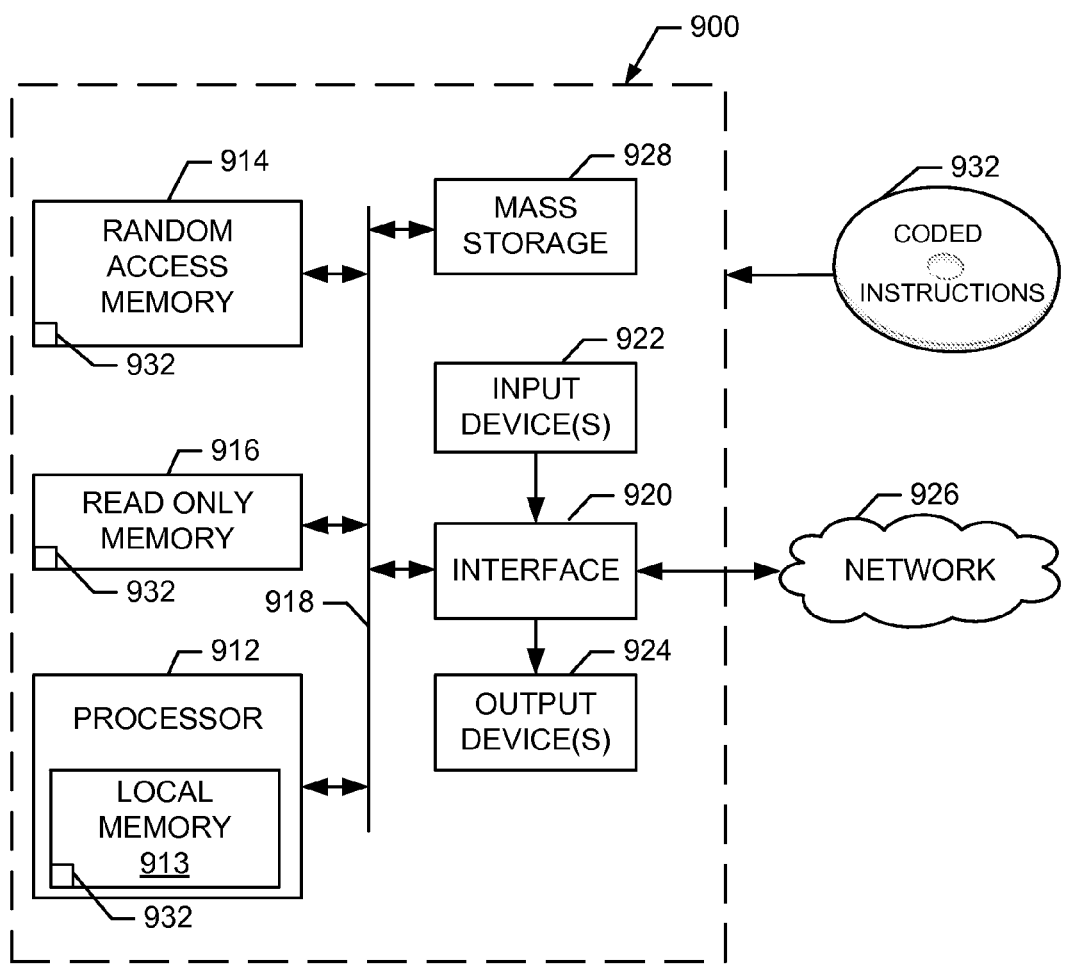
FIG. 9 is a block diagram of an example processor platform that may be used to implement the methods and apparatus described herein.

FIG. 9 is a block diagram of an example processor platform 900 to implement the methods of FIGS. 5 and/or 6 and/or. The processor platform 900 can be, for example, a server, a personal computer, or any other type of computing device or combination of computing devices.

The processor platform 900 of the instant example includes a processor 912. For example, the processor 912 can be implemented by one or more microprocessors or controllers from any desired family or manufacturer.

The processor 912 includes a local memory 913 (e.g., a cache) and is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 also includes an interface circuit 920. The interface circuit 920 may be implemented by any type of interface standard, such as an Ethernet interface, a universal serial bus (USB), and/or a PCI express interface.

One or more input devices 922 are connected to the interface circuit 920. The input device(s) 922 permit a user to enter data and commands into the processor 912. The input device(s) can be implemented by, for example, a keyboard, a mouse, a touchscreen, a voice recognition system, and/or any other method of input or input device.

One or more output devices 924 are also connected to the interface circuit 920. The output devices 924 can be implemented, for example, by display devices (e.g., a liquid crystal display, a cathode ray tube display (CRT), a printer and/or speakers). The interface circuit 920, thus, typically includes a graphics driver card.

The interface circuit 920 also includes a communication device such as a modem or network interface card to facilitate exchange of data with external computers via a network 926 (e.g., an Ethernet connection, a wireless local area network (WLAN) connection, coaxial cable, a cellular telephone system, etc.).

The processor platform 900 also includes one or more mass storage devices 928 for storing software and data, such as circuit design and/or layout files. Examples of such mass storage devices 928 include floppy disk drives, hard drive disks, compact disk drives and digital versatile disk (DVD) drives.

Coded instructions 932 to implement the methods of FIGS. 5 and/or 6 may be stored in the mass storage device 928, in the volatile memory 914, in the non-volatile memory 916, and/or on a removable storage medium such as a CD or DVD.

Although certain example apparatus and methods have been described herein, the scope of coverage of this disclosure is not limited thereto. On the contrary, this disclosure covers all apparatus and methods fairly falling within the scope of the appended claims.

What is claimed is:

1. An apparatus, comprising:
a first junction isolated clamp circuit to be coupled between a first power circuit and a signal node, the first power circuit to provide a first reference voltage, and the first clamp circuit to direct energy from the signal node to the first power circuit in response to a transient event resulting in a voltage at the signal node being lower than a second reference voltage; and
a second junction isolated clamp circuit to be coupled between a second power circuit and the signal node, the second junction isolated clamp circuit comprising at least a junction isolated transistor, a collector terminal of the junction isolated transistor to be prevented from having a lower voltage than the second reference voltage, the second power circuit to provide the second reference voltage, the second reference voltage to be a lower voltage than the first reference voltage, and the second clamp circuit to direct energy from the signal node to the second power circuit in response to a transient event resulting in the voltage at the signal node being higher than the first reference voltage.

2. The apparatus of claim 1, wherein the second clamp circuit comprises a plurality of transistors, and the second clamp circuit is to prevent respective collector terminals of the transistors from having respective voltages less than the second reference voltage.

3. The apparatus of claim 2, wherein the collector terminals of the transistors of the second clamp circuit are prevented from having voltages less than the second reference voltage when the second power circuit is disconnected from a power supply.

4. The apparatus of claim 1, wherein the second junction isolated clamp circuit is to reduce signal crosstalk at the signal node when the second power circuit is disconnected from a power supply.

5. The apparatus of claim 1, wherein the second clamp circuit comprises:
a first transistor to have a reverse bias between the signal node and the second power circuit;
a second transistor to have a forward bias between the signal node and the second power circuit, the second clamp circuit to direct energy from the signal node to the second power circuit when a transient voltage at the signal node is greater than a sum of a reverse bias voltage of the first transistor and a forward bias voltage of the second transistor; and
a diode to isolate a collector terminal of at least one of the first or second transistors from the transient voltage of the signal node.

6. The apparatus of claim 5, wherein respective base terminals of the first and second transistors are electrically connected, and the second clamp circuit further comprises a resistor to provide a resistive path having at least a threshold resistance between the base terminals of the first and second transistors and the second power circuit.

7. The apparatus of claim 1, wherein the second clamp circuit comprises:
a first transistor having a reverse bias voltage for a first p-n junction from the signal node to the second power circuit and having a collector terminal; and
a second transistor having a forward bias voltage for a first p-n junction from the signal node to the second power circuit and having a collector terminal, the collector terminals of the first and second transistors being electrically connected, the second clamp circuit to prevent the collector terminals from having voltages less than the second reference voltage, and the second clamp circuit to direct energy from the signal node to the second power circuit when a transient voltage at the signal node is greater than a sum of the reverse bias voltage and the forward bias voltage.

8. The apparatus of claim 1, wherein the first and second clamp circuits comprise an integrated circuit, the integrated circuit to be electrically connected to the second power circuit.

9. The apparatus of claim 1, wherein the second clamp circuit comprises:
a first integrated circuit portion comprising a first n+ doped terminal and a first p+ doped terminal within a first p well, and a second n+ doped terminal within a first n well; and
a second integrated circuit portion comprising a third n+ doped terminal and a p+ doped terminal within a second p well, and a fourth n+ doped terminal within a second n well.

10. The apparatus of claim 9, wherein the first integrated circuit portion comprises a first deep n well and the second integrated circuit portion comprises a second deep n well, the first and second deep n wells to provide junction isolation.

11. The apparatus of claim 1, wherein the second clamp circuit comprises:
a first integrated circuit portion comprising includes a first n+ doped terminal within a first p doped portion and a second n+ doped terminal adjacent the first p doped portion; and
a second integrated circuit portion comprising a third n+ doped terminal within a second p doped portion and a fourth n+ doped terminal.

12. The apparatus of claim 11, wherein the second integrated circuit portion further comprises an n-epitaxy layer, a portion of the n-epitaxy layer separating the fourth n+ doped terminal second p doped portion.

13. A method, comprising:
identifying, using a processor, a first circuit electrically coupled between a signal node and a first power supply node in a circuit design data file, the first power supply node being associated with a first reference voltage;
identifying, using the processor, a second circuit electrically coupled between the signal node and a second power supply node in the circuit design data file, the first reference voltage being higher than a second reference voltage associated with the second power supply node;
determining, using the processor, whether any collector terminals in the second circuit may have a voltage applied that is lower than the second reference voltage; and
logging an event when any of the collector terminals in the second circuit are capable of having a lower voltage than the second reference voltage.

14. The method of claim 13, further comprising:
determining whether the signal node experiences signal crosstalk when the second power supply node is not coupled to a power supply; and
logging a second event in response to determining that the signal node experiences signal crosstalk when the second power supply node is not coupled to the power supply.

15. The method of claim 13, wherein the collector terminals comprise collector terminals of respective junction isolated transistors.

16. The method of claim 13, further comprising determining, using the processor, whether any of the collector terminals in the second circuit may have a voltage applied that is lower than the second reference voltage in response to a transient voltage being applied to the signal node.

17. The method of claim 13, further comprising:
determining, using the processor, whether the second circuit includes at least a forward biased base-emitter junction and a reverse biased base-emitter junction coupled between the signal node and the second power supply node; and
logging an event when the second circuit does not include at least a forward biased base-emitter junction and a reverse biased base-emitter junction coupled between the signal node and the second power supply node.

18. The method of claim 13, wherein determining whether any of the collector terminals have a voltage applied that is lower than the second reference voltage comprises simulating resulting voltages caused by a transient event at the signal node.

19. A computer readable storage medium comprising machine readable instructions which, when executed, cause a processor to:
identify a first circuit electrically coupled between a signal node and a first power supply node in a circuit design data file, the first power supply node being associated with a first reference voltage;
identify a second circuit electrically coupled between the signal node and a second power supply node in the circuit design data file, the first reference voltage being higher than a second reference voltage associated with the second power supply node;

determine whether any collector terminals in the second circuit may have a voltage applied that is lower than the second reference voltage; and log an event when any of the collector terminals in the second circuit are capable of having a lower voltage than the second reference voltage.

20. The storage medium of claim 19, wherein the instructions are further to cause the processor to:

determine whether the signal node experiences signal crosstalk when the second power supply node is not coupled to a power supply; and log a second event in response to determining that the signal node experiences signal crosstalk when the second power supply node is not coupled to the power supply.

21. The storage medium of claim 19, wherein the collector terminals comprise collector terminals of respective junction isolated transistors.

22. The storage medium of claim 19, wherein the instructions are further to cause the processor to determine whether any of the collector terminals in the second circuit have a voltage applied that is lower than the second reference voltage in response to a transient voltage being applied to the signal node.

23. The storage medium of claim 19, wherein the instructions are further to cause the processor to:

determine, using the processor, whether the second circuit includes at least a forward biased base-emitter junction and a reverse biased base-emitter junction coupled between the signal node and the second power supply node; and log an event when the second circuit does not include at least a forward biased base-emitter junction and a reverse biased base-emitter junction coupled between the signal node and the second power supply node.

24. The storage medium of claim 19, wherein the instructions are to cause the processor to determine whether any of the collector terminals may have a voltage applied that is lower than the second reference voltage by simulating resulting voltages caused by a transient event at the signal node.

* * * * *